May 7, 1957   A. THAON DE SAINT-ANDRÉ   2,791,338
STORAGE INSTALLATIONS, IN PARTICULAR PARKING
INSTALLATIONS FOR AUTOMOBILE VEHICLES
Filed April 11, 1955   6 Sheets-Sheet 1

INVENTOR
ANDRÉ THAON DE SAINT-ANDRÉ
BY
Larson & Whiting ATTORNEY

May 7, 1957 A. THAON DE SAINT-ANDRÉ 2,791,338
STORAGE INSTALLATIONS, IN PARTICULAR PARKING
INSTALLATIONS FOR AUTOMOBILE VEHICLES
Filed April 11, 1955 6 Sheets-Sheet 2
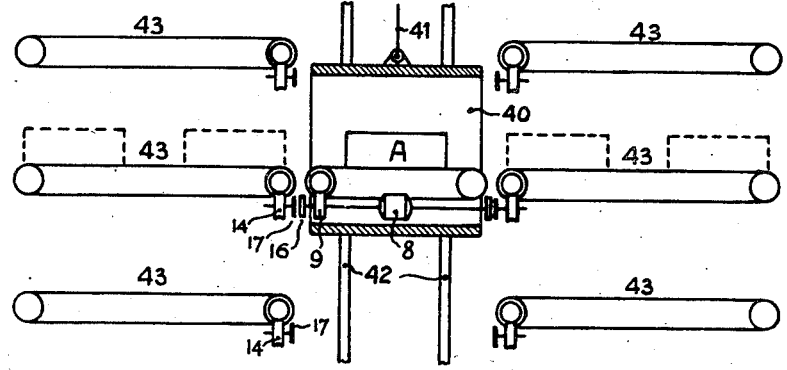
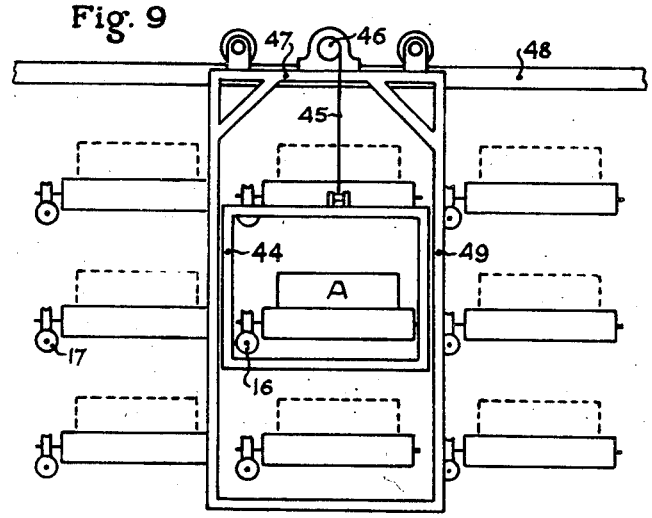
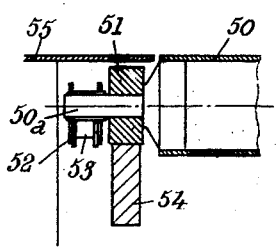
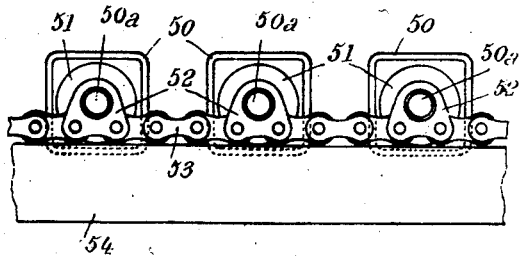
INVENTOR
ANDRÉ THAON DE SAINT-ANDRE
BY
ATTORNEY

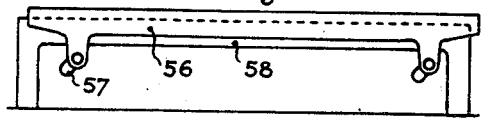
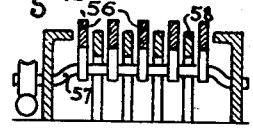
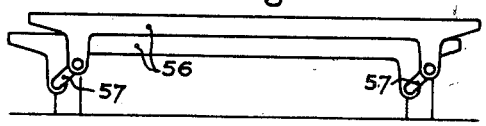
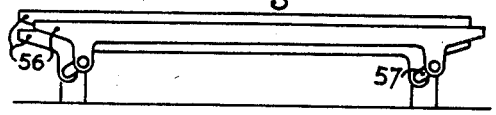
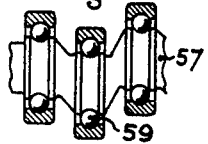
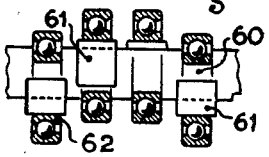
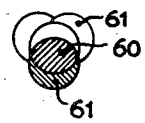
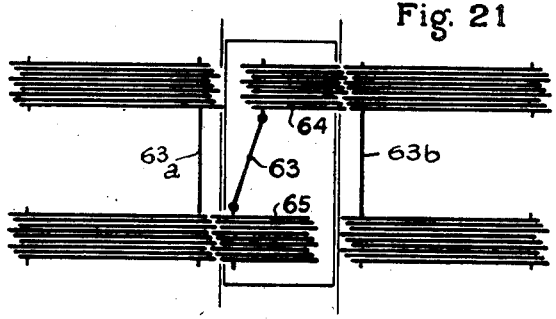
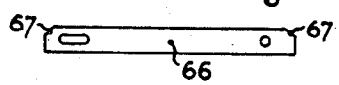
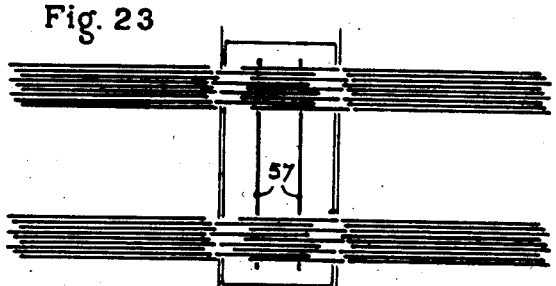

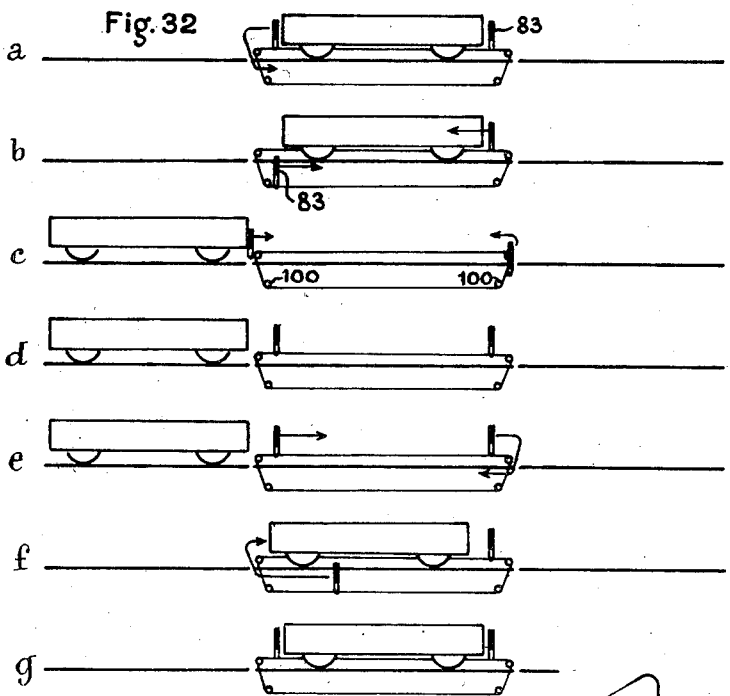
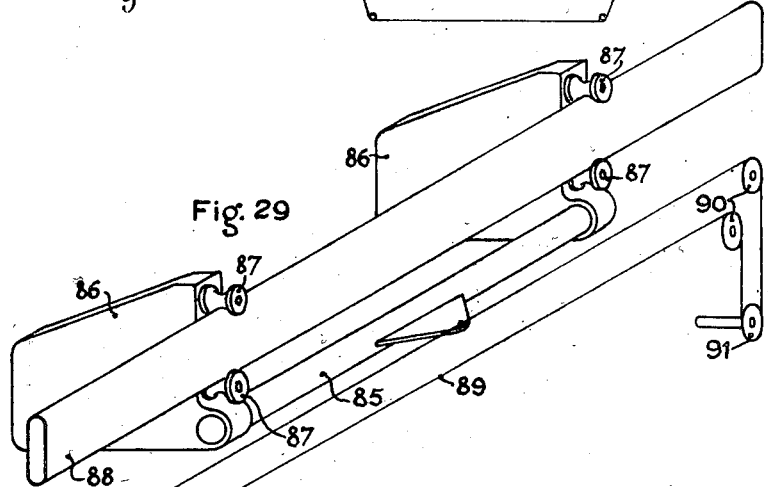
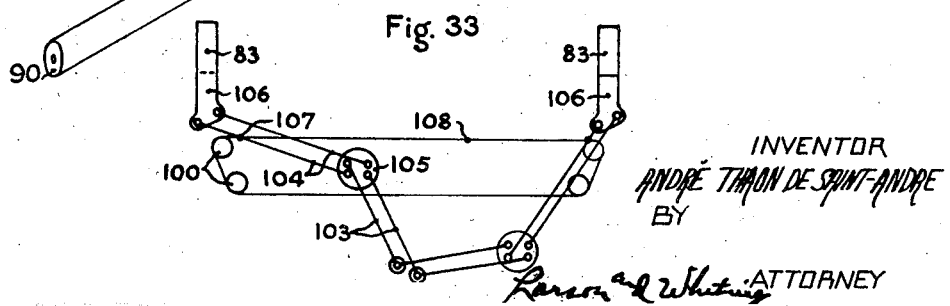

United States Patent Office 2,791,338
Patented May 7, 1957

2,791,338

STORAGE INSTALLATIONS, IN PARTICULAR PARKING INSTALLATIONS FOR AUTOMOBILE VEHICLES

André Thaon de Saint-André, Montreux-Clarens, Switzerland

Application April 11, 1955, Serial No. 500,481

Claims priority, application Switzerland February 23, 1955

2 Claims. (Cl. 214—16.1)

The present invention relates to storage installations, that is to say installations intended temporarily to receive objects arriving in any order whatever and which must be delivered also in any order whatever, that is to say in an order which cannot be known in advance. My invention is more especially concerned with parking or garage installations for motor cars.

The object of my invention is to provide an installation of this type which is better adapted to meet the requirements of practice than those known at the present time, in particular in order to utilize the available space with the maximum of efficiency while increasing the rapidity of operations.

The installation according to my invention includes at least one movable horizontal platform, guided and controlled in such manner that it can be brought into any of a multiplicity of positions in each of which it is located opposite and at the same level as at least one storage area intended to receive the objects to be stored, said platform being provided with conveyor means for moving objects present therein toward said areas. The essential feature of my invention is that these areas include respective individual conveyor means for moving with respect thereto objects in a direction parallel to the above mentioned direction, these means being controlled through a transmission adapted to be coupled with a power plant carried by the platform when said platform is located opposite each of said storage areas.

Preferred embodiments of my invention will be hereinafter described with reference to the accompanying drawings given merely by way of example and in which:

Fig. 8 is an elevational view of another installation according to my invention.

Fig. 9 is an elevational view of still another installation according to my invention.

Fig. 10 is a side view of a portion of a conveyor device for use according to my invention.

Fig. 11 is a vertical cross sectional view of the conveyor device of Fig. 10.

Figs. 12, 13 and 14, 15 show two conveyor systems illustrated to facilitate explanation of the invention.

Figs. 16 and 17 are respectively a side view and a front view of a conveyor system for use in an installation according to my invention.

Fig. 18 is a detail view corresponding to Figs. 16 and 17.

Figs. 19 and 20 are respectively a side view and an end view of a modification of the arrangement of Fig. 18.

Fig. 21 is a plan view of an installation according to another embodiment of my invention.

Fig. 22 is a separate view of an element of a system of the same kind.

Fig. 23 is a view similar to Fig. 21 showing a modification making use of an element as shown by Fig. 22.

Figs. 29 to 31 are respectively a perspective view, an end view and a side view of elements of the installation diagrammatically illustrated by Fig. 28.

Fig. 32 is an elevational explanatory view showing different positions of a vehicle with respect to the platform and one of the storage areas located adjacent thereto.

Fig. 33 is an elevational view of a modification.

Figure 1:
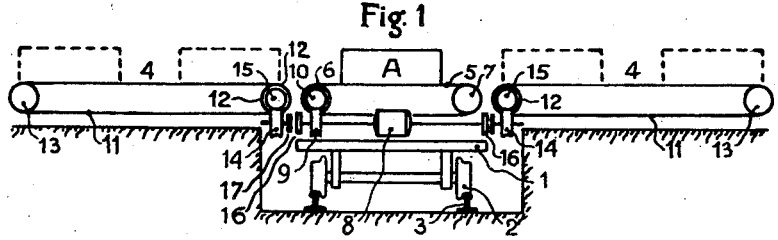
Fig. 1 is an elevational view of a storage installation made according to my invention.
Figure 2:
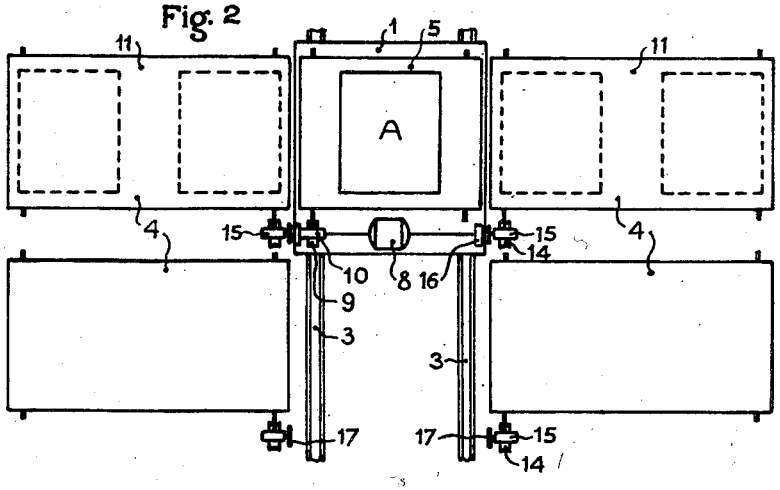
Fig. 2 is a plan view corresponding to Fig. 1.

In the embodiment illustrated by Figs. 1 and 2, the installation includes a carriage or platform 1 mounted on wheels 2 running on fixed horizontal rails 3 between two rows of storage areas 4. On carriage 1 is mounted an endless belt conveyor 5 running on two drums 6 and 7 the first of which is driven by a motor 8, for instance through a worm and worm wheel 9—10.

Each of the storage areas 4 is provided with a corresponding endless belt conveyor 11 mounted on two drums 12 and 13 the first of which can be driven through a worm wheel 14 in mesh with a worm 15 rigid with said drum 12. The rails which support carriage 1 are so positioned that when said carriage is brought in working position opposite a storage area 4, the respective endless belts 5 and 11 of said carriage and said storage area are at the same level and the shafts of worm wheels 9 and 14 are substantially in line.

The driving shaft which carries worm wheel 9 is provided at its ends with an electromagnetic plate 16 and the shafts of screw wheels 14 in line with said first mentioned shaft are also provided, at their ends turned toward the carriage, each with a soft steel disc 17. Plates 16 and 17 are disposed in such manner that they move in planes located very close to each other without however involving any risk of contact during the displacement of the carriage. In these conditions, when carriage 1 is stopped opposite a storage area 4, it suffices to energize electromagnetic plate 16 to couple it with the corresponding soft steel plate or disc 17 so that the conveyor belt of this storage area is driven at the same time as the conveyor belt of the carriage. Thus, an object A placed on the conveyor belt of the carriage can be brought in any of the positions indicated in dotted lines on Fig. 2.

Figure 3:
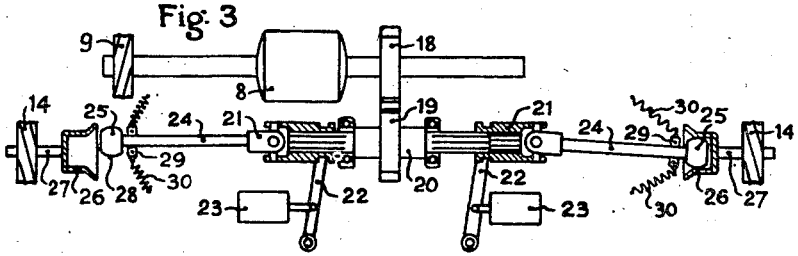
Fig. 3 is a detailed plan view on an enlarged scale showing the transmission between the platform and one of the storage areas.
Figure 4:
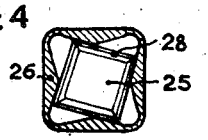
Fig. 4 is a sectional view on an enlarged scale of one of the parts of the transmission illustrated by Fig. 3.

In the modification of Figs. 3 and 4, the drive between the shafts carrying the worm wheels 9 and 14 is obtained as follows. The shaft of motor 8 carries a toothed wheel 18 which meshes with a toothed wheel 19 mounted on a splined shaft 20. On the ends of said shaft 20 are slidably mounted universal joints 21 under the action of a fork 22 controlled in any suitable manner. For instance, said fork 22 is controlled by means of an electro-magnet 23.

Each of these universal joints 21 drives a shaft 24 provided at the end thereof with a square-section member 25 intended to engage a square-section sleeve 26 the inlet end of which is flaring toward said member 25. Said sleeve 26 is fixed at the end of the shaft 27 of worm wheel 14. Member 25 is provided with four cylindrical surfaces 28 whereby shaft 24 can assume a slightly oblique position with respect to shaft 27 when carriage 1 is not located exactly opposite storage area 4 or is not exactly at the same level. Shaft 24 is supported in the vicinity of member 25 by a bearing 29 elastically supported between several oblique springs 30 the function of which is both to position member 25 elastically and to keep it normally away from sleeve 26. When electro-magnet 23 is energized, fork 22 pushes the universal joint 21 together with the square-shaped member 25 toward sleeve 26 and said member engages said sleeve owing to the flaring shape of the inlet end thereof. If sleeve 26 is not exactly opposite member 25, said member engages said sleeve only after motor 8 has been started. This is facilitated by the high angular play existing between member 25 and sleeve 26, as shown by Fig. 4.

Figures 5, 6:
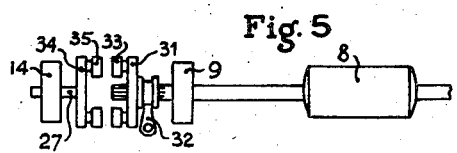
Fig. 5 is a view similar to Fig. 3 showing another modification of the transmission.
Fig. 6 shows a detail of Fig. 5.

In the modification of Figs. 5 and 6, I avoid the necessity of making use of a universal joint such as 21 and toothed wheels such as 18 and 19 by mounting at each end of the shaft of motor 8 a sliding splined arm 31 positioned by fork 32 and provided at the ends thereof with rollers 33. The shaft 27 of worm wheel 14 carries a similar arm 34 rigid therewith and also provided with rollers 35. When fork 32 brings the rollers 33 of arm 31 into the plane of the rollers 35 of arm 34, there is a transmission from motor 8 to the conveyor belt of the storage area 4, with a possibility of eccentricity according to the diameter of the rollers.

Figure 7:
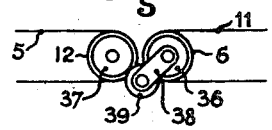
Fig. 7 is an elevational partial view of a third modification of the transmission.

In the construction of Fig. 7, the shafts of drums 6 and 12 are respectively provided with toothed wheels 36 and 37 of the spur gear type. An arm 38 oscillating on the shaft of drum 6 carries a toothed pinion 39 which is constantly in mesh with toothed wheel 36. By rotating arm 38, pinion 39 can be brought into mesh with toothed wheel 37, which achieves a very simple transmission.

Up to now it has been supposed that platform 1 was movable along a rectilinear or curvilinear horizontal path. In the construction of Fig. 8, the platform is movable vertically and constitutes an elevator. The installation includes a car 40 hanging from a cable 41 and guided by vertical guard-rails 42 between storage areas 43 located at different levels. Otherwise, the installation is similar to that above described.

The platform may also move in a direction having two components one of which is horizontal and the other vertical, the storage areas being disposed in a plurality of superposed horizontal rows. In this case, the platform may be constituted by a carriage rolling horizontally on an elevator or, as it seems simpler, by an elevator the cage of which is movable horizontally between suitable limits.

Fig. 9 shows an example of such an arrangement, car 44 being supported by a cable 45 passing round a winch 46 mounted on a carriage 47 running on rails 48 disposed at the top of the building. Cage 49 which serves to guide car 44 is also supported by carriage 47. The displacement of the objects from the platform is the same as above described.

If the objects to be stored are automobile vehicles, the installation must be arranged in a special fashion. As a matter of fact, if every car is disposed parallel to the trajectory or to the plane along which the platform is moving, the wheels of the vehicle might drop in the hollow formed by the passage from one endless conveyor to the next one, that is to say from the endless conveyor of the platform to that of the adjacent storage area. This hollow can be reduced by reducing the radius of the drums on which the endless belts are mounted and by making said belts as flexible as possible through any conventional construction.

I may make use of the arrangement disclosed by Figs. 10 and 11. This conveyor device includes a multiplicity of tubes 50 of square (or more generally polygonal) cross section carrying each, at each end thereof, a spindle 50a on which is journalled a roller 51 and a connecting plate 52. These connecting plates 52 are fixed, at suitable intervals, to links of a driving chain 53. It is thus possible to give the chain a very small radius of winding about the end drums of the conveyor, while obtaining a positive drive of the objects placed on the conveyor, which would not be the case if tubes 50 had a circular cross section, instead of a square one. Rollers 51 run on rails 54 protected by a shield plate 55.

In order to eliminate the hollow above referred to, I may proceed as follows:

In the construction of Figs. 12 to 17, the conveyors are no longer endless belt conveyors but are constituted by a multiplicity of horizontal bars 56, parallel to the direction in which the movement is to take place and carried by the crank pins of crankshafts 57. In the construction of Figs. 12 and 13, there is only one crank pin and all the movable bars 56 are located in the same plane, these bars passing between fixed bars 58 located midway of the vertical displacement of bars 56. But in this case fixed bars 58 produce no work and one half of the time is lost so that the efficiency is very low. In the construction of Figs. 14 and 15, there are no longer any fixed bars and the movable bars 56 are carried by crank pins alternately at 180° from each other. In this case, the speed of displacement is twice that obtained with the construction of Figs. 12 and 13, but the efficiency is still rather low because the instantaneous translatory velocity becomes zero every time the object to be conveyed passes from a downwardly moving bar to an upwardly moving one. Furthermore, as in the preceding case, the crankshafts 57 of the conveyor must be connected together through positive connections without play.

In the construction of Figs. 16 and 17 according to my invention, the system is considerably improved because the movable bars 56 are distributed on three different crank pin positions. In this case, only one crankshaft 57 must be a driving one since there is no dead center positions.

Such an arrangement makes it possible to drive one conveyor, for instance one carried by a storage area, from another conveyor, to wit one carried by the platform, by mere juxtaposition. Of course, the conveyor carried by the platform must be able to occupy two positions by lateral displacement with respect to said platform. In one of these positions of rest, the conveyor system carried by the platform is at a distance from the conveyor carried by the storage areas slightly greater than twice the radius of the crank arms. Thus there is no risk of one of the parts catching the other when the platform is being displaced. In order to couple the conveyor of one storage area with the conveyors carried by the platform, it suffices to move the last mentioned conveyor into contact with the first one by a displacement in the direction of the bars of this conveyor. Of course, the helical distribution of the crank pins must be the same in all the conveyors. Also the movement of the platform conveyor toward a storage area conveyor must be controlled elastically (by a spring, an electro-magnet or the like) because there are several possibilities of placing the bars in unstable balance abutting relation before the normal abutting position is obtained. As soon as the driving conveyor is operated, the abnormal positions will cease to exist and the two conveyors will be in mesh with each other.

The number of crankshafts 57 must be such that bars 56 are not bent too much between two successive crankshafts. For instance, there will be two crankshafts on the platform and three on the storage areas, each of these last mentioned areas being provided for two motor cars. Advantageously ball bearings are used to mount bars 56 on the crankshafts. According to the arrangement of Fig. 18, crankshaft 57 is machined in such manner as to be directly in contact with the balls 59 of the ball bearings.

In the construction of Figs. 19 and 20, the crankshaft is provided with eccentric portions 60. Crescent-shaped parts 61 are fixed between the eccentric shaft portions 60 and the inner rings 62 of the ball bearings.

Of course it is not necessary for the conveyor to extend over the whole length of the motor car. It suffices to provide two conveyor sections (or groups of conveyor bars) corresponding to the front and rear axles of the cars respectively and to constitute each group by a sufficient number of bars in view of the maximum and minimum wheelbases of the vehicles. In this case, preferably, the two conveyor sections or groups are mounted with a phase difference of 60° with respect to each other. Thus, when a bar of one group is lifting for instance the front wheels of a vehicle, there is simultaneously a bar of the other group which is lowered under the rear wheels of the same vehicle, and inversely, so that the power necessary for operating the two conveyor systems is considerably reduced.

Such an arrangement including two conveyor systems each of which corresponds to one of the axles of a vehicle facilitates the simultaneous drive by direct engagement of the conveyor means carried by two storage areas located on opposite sides of the platform, which is useful when it is desired to withdraw a car located at the remote end of one of the storage areas and when a place is free in the opposite storage area. In this case, I engage the conveyor means of the storage area in which is located the car to be withdrawn with the conveyor system of the platform, so as to move the two cars in the storage area where is located that to be withdrawn and to bring the other vehicle from said storage area onto the platform. When this is done, the two groups of conveyor means of the conveyor system of the platform (i. e. the groups corresponding resspectively to the two axles of a car on the platform) are engaged respectively with the two conveyor systems of the storage areas located on opposite sides of the platform so that all the conveyor means are worked simultaneously and the car located on the platform is now transferred onto the storage area, opposite to that on which it was initially located, whereas the car to be withdrawn is brought onto the platform.

Simultaneous driving of the conveyor means carried by the storage areas by direct engagement is obtained, in the arrangement illustrated by Fig. 21, by interposing a shaft 63 provided with two universal joints at the end thereof between the two driving conveyor groups 64 and 65 of the platform and by making these two conveyor groups movable transversely independently of each other, whereby one of them can be used to drive the conveyor means of the storage area located on one side of the platform, whereas the other serves to drive the conveyor means of the storage area located on the opposite side of the platform. Of course, it is necessary, as diagrammatically shown on Fig. 21 at 63a and 63b, to provide means for interconnecting the two conveyor means of each of the two storage areas.

The arrangement above described involves, in order to be able directly to engage a conveyor system of the platform with one of the conveyor means of a storage area located opposite said platform, the necessity of forming a relatively large gap between conveyor groups which, although working in synchronism, are not in contact with each other. It therefore seems preferable to use the arrangement illustrated by Figs. 22 and 23. In this case, the crankshafts 57 driving the two conveyor groups of the platform are driven independently of each other but in such manner as to remain in phase with each other. Bars 66 are each provided at one end with a circular hole and at the other end with a rectilinear slot which may or may not be open at one end. Thus one end of each of said bars 66 is positively driven so as to have a circular movement and the other end is moved so as to impart thereto only the vertical component of this movement. It is thus possible to move the two crankshafts 57 with respect to the platform away or toward each other in a direction parallel to said bars 66. Bars 66 are disposed alternately with their circular hole on one side and on the opposite side. The movement is then as diagrammatically illustrated by Fig. 23 and there is no longer a large gap between the conveyor means of the platform and of the storage areas. Furthermore, each conveyor group corresponding to one axle is driven by direct engagement with a conveyor group of the platform without a connection such as 63a and 63b (Fig. 21) being necessary in this case.

There is practically no gap between the conveyor groups of the platform and those of the storage areas with such an arrangement, but this necessitates an accurate locating of said conveyor groups at the same level. The ends of the bars are slightly chamfered, as shown at 67, so as to allow for a very slight difference between these levels.

Figure 24:
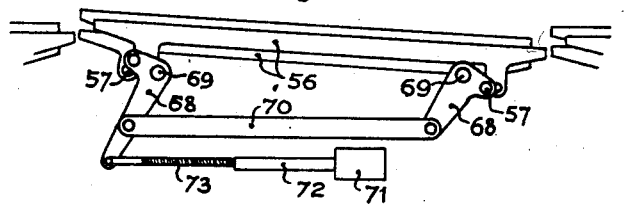
Fig. 24 is a side view of a particular arrangement for use in systems as illustrated by Figs. 21 and 23.

When the platform is movable vertically and when positioning of the platform exactly at the levels of the storage areas would prove to require too costly an arrangement, it may be preferable to give the conveyor means a possibility of slight adjustment by pivoting thereof about a horizontal axis at right angles to the direction of displacement of the conveyor means. According to Fig. 24, this result is obtained by mounting the crankshaft 57 on ball crank levers 68 pivoted about fixed axes 69. Horizontal rods 70 are interposed between the lower ends of levers 68 so that one crank shaft 57 is given a vertical displacement equal and of a direction opposed to that of the other crankshaft. An electric motor 71 the shaft of which is provided with a tubular nut 72 engaged around a screw-threaded rod 73 connected to one of the levers 68 makes it possible to control from a distance the desired pivoting displacement of the platform conveyor system.

Figure 25:
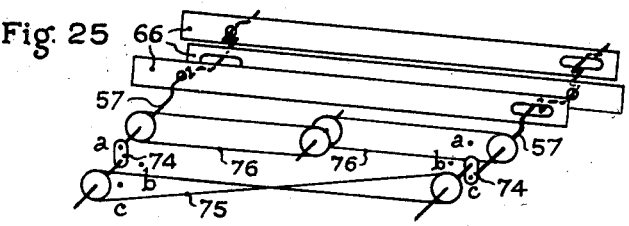
Fig. 25 is a perspective view of a modification.

Fig. 25 shows a device for imparting a similar angular displacement to a conveyor system of the kind illustrated by Fig. 23. On Fig. 25 only three conveyor bars 66 have been shown. The crankshafts 57 are carried by levers 74 the angular displacements of which are interconnected by a crossed chain 75 so that these displacements take place in opposed directions. Said levers 74 can assume three different positions marked a, b and c.

Crankshafts 57 are interconnected by transmission chains 76 which are stretched for the working positions a and c, so as to ensure a satisfactory synchronism between the movements of the two crankshafts. On Fig. 25, the parts are shown in relative positions corresponding to a displacement from the right toward the left of the conveyor system.

The conveyor means of the storage areas may have a very slight slope so that the vehicles located in the end positions and which may be slightly jarred by operations concerning the vehicles located between them and the platform have a tendency to move away from said platform rather than toward it, which would be dangerous. Abutment means are provided to cooperate with the tires of said vehicles so as to avoid contact between the bodies thereof and the fixed elements of the installation.

Figure 26:
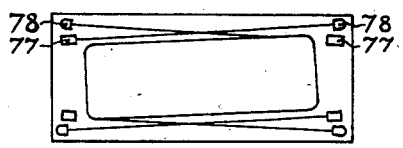
Fig. 26 is a plan view of a device for checking the correct position of the articles on the platform.

If, for any cause whatever, a vehicle in the storage installation tends to assume an oblique position, it is advantageous to provide safety means and to return it into correct position. According to the arrangement illustrated by Fig. 26, the platform is provided at the four corners thereof with four photo-electric cells 77 which receive light rays from four sources 78 also located at said corners but a little nearer the sides of the platform. Each of said photo-electric cells is adapted to receive the light beams from the luminous source 78 located at the other end of the platform and in view of the relative positioning of the light sources and of the photo-electric cells, these light beams are slightly inclined with respect to the axis of the platform. Thus the two light beams on each side of the platform cross each other approximately in the middle transverse plane of said platform. The means for controlling the conveyor systems from a distance are arranged in such manner that the theoretical displacements are all of the same length. The motor which drives the two platform conveyor groups is located between them and can drive them independently of each other through electromagnetic clutches. At the end of every operation, if every photo-electric cell 77 receives the light beam directed toward it, the platform is brought into motion in the desired direction through automatic control means. If a cell is not energized, due to the fact that the light beam directed toward it is cut off by the vehicle because this vehicle is placed in oblique position (see, on Fig. 26, the photo-electric cell 77 on the top right hand corner), this cell engages the electro-magnetic clutch located on the same side and starts the engine in the direction which moves the car or the vehicle away from the beam until said beam can pass to the photo-electric cell. If, as shown by Fig. 26, the obliquity of the vehicle is such that two diagonally opposed photo-electric cells are cut off from their sources of light, the above arrangement would correspond to engaging both of the electromagnetic clutches and operating the motor into opposed directions, which is of course impossible. The electric lay-out is established in such manner that one group of cells, for instance those located at the front ends of the cars, exerts a preponderating action as compared to that of the second one. The action of the photo-electric cells of the second group therefore can be exerted only when that of the cells of the first group has finished. In most cases, the first action will restore passage for the two light beams and therefore make the second action unnecessary.

Figure 27:
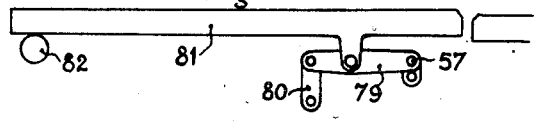
Fig. 27 is a side view of a conveyor element for use in an installation according to my invention.

When the objects to be stored are automobile vehicles, the tires thereof absorb the shocks caused by the upward and downward movements of the conveyor bars. In the case of rigid and fragile objects, it is necessary to reduce the vertical amplitude of the movement. According to the arrangement illustrated by Fig. 27, crankshaft 57 controls primary rods 79 pivotally connected to secondary rods 80 the other end of which is fixed. Every conveyor bar 81 is pivoted at one end on a primary rod 79 at a point located near the middle thereof and the trajectory of which is substantially an ellipse. The other end of said conveyor bar is resting on a roller 82 located beyond the extreme position that can be reached by the objects to be stored. Every point of bar 81 therefore describes an ellipse which is the more flattened as one gets near roller 82.

In some cases, in particular when the dimensions of the installation make it necessary, it may be desirable to dispose the storage areas in the longitudinal direction. In the case of automobile vehicles, this corresponds to moving them in their normal running direction. Conveying by means of bars as above described is no longer advisable due to the great length thereof, and it is certainly simpler and more economical to displace the vehicles by running them on their own wheels.

Figure 28:
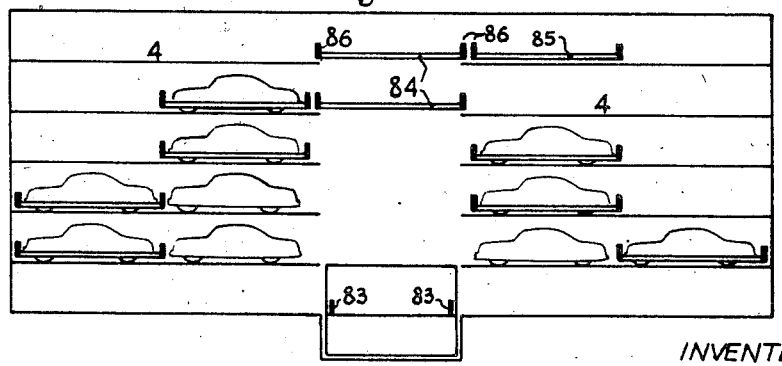
Fig. 28 is an elevational view of a garage for automobile vehicles to be displaced horizontally by rolling on their own wheels.

In the embodiment of my invention illustrated by Fig. 28, the storage installation is divided into several vertical sections including each several floors and every floor is provided with four parking places each for one vehicle located in the same line and forming two groups of two, located on opposite sides of the elevator space. The platform includes two independent push-members 83 movably mounted on said platform and serving to drive the vehicles away from the platform, as it will be hereinafter explained. Furthermore, every storage area is provided with a conveyor 84 disposed on one side of said storage area and serving to push the first car delivered from the platform from the first place in said storage area to the second one and inversely to return the two vehicles located on the storage area toward and onto the platform. On Fig. 28, various locations of the vehicles are shown on different floors respectively.

Fig. 29 shows a storage area conveyor such as diagrammatically shown on Fig. 28 by reference number 84. This conveyor includes a bar 85 of a length greater than that of a large size motor car provided at each end thereof with an arm 86 at right angles thereto and located at the normal level of motor car bumpers. Said bar 85 and said arm 86 are provided with rollers 87 engaging a guide rail 88 so that the whole of bar 85 and arm 86 can slide along said rail. The conveyor system 85—86—87 can be moved along rail 88 by means of a cable 89 having one point thereof fixed to bar 85 and running over pulleys 90 and a driving wheel 91. Thus, bar 85 can be moved from the position shown on the ground floor and the first floor on the left hand side of Fig. 28 to the position shown on the third and fourth floors on said left hand side of Fig. 28, and finally to the position shown on the top floor of Fig. 28. In order to enable the system to assume this last mentioned position, the frame 92 of the platform is open on one side as shown in cross section on Fig. 30.

In order to guide the motor vehicle, the platform and the storage areas are provided on the side thereof where are located conveyors 85—86 with U-shaped guiding means. For instance, in order to reduce friction, the sides of said U may be constituted by cylindrical rollers 93 freely rotatable in supports 94.

According to the main feature of my invention, driving wheels 91 (Fig. 29) are operated by power means carried by the platform when said platform is at the level of the storage area including the driving wheels 91 to be operated.

Push-members 83 carried by the platform have two purposes the first of which is to evacuate from the platform the second vehicle to be placed on a storage area (that is to say that which is to be on the place immediately adjacent to the conveyor shaft) since the side conveyor 84 of the storage area has been used to drive the first vehicle to its location and cannot be used for the second vehicle. The second function of these push-members 83 is to move in central position on the platform the vehicles that are being conveyed by said platform during the vertical displacements thereof, in order to avoid any possibility of accident.

Figure 30:
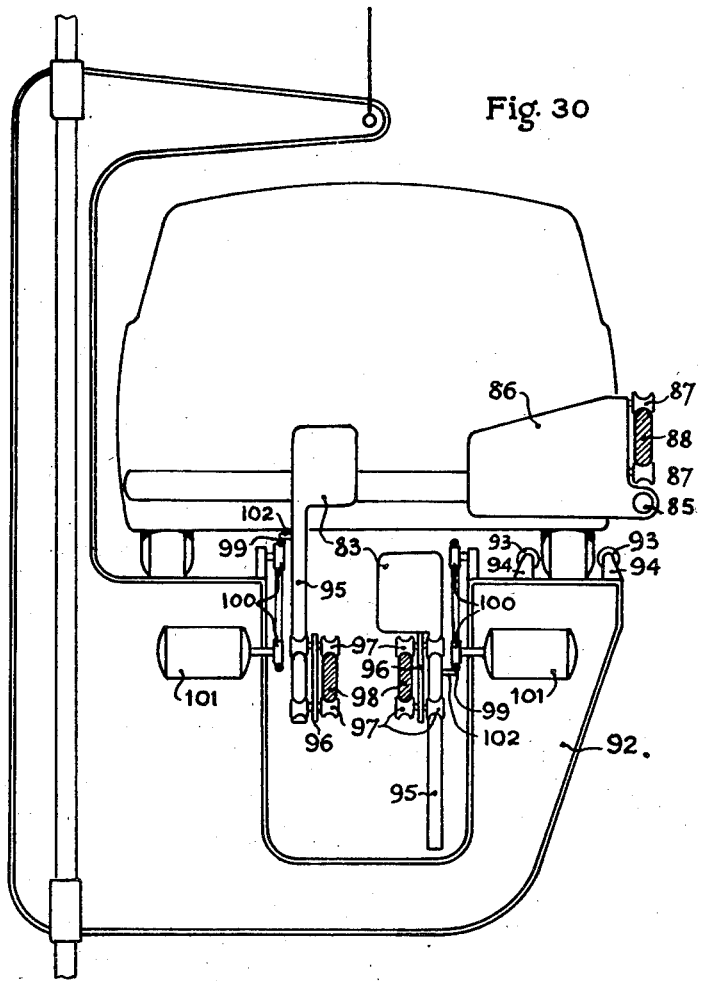
Figure 31:
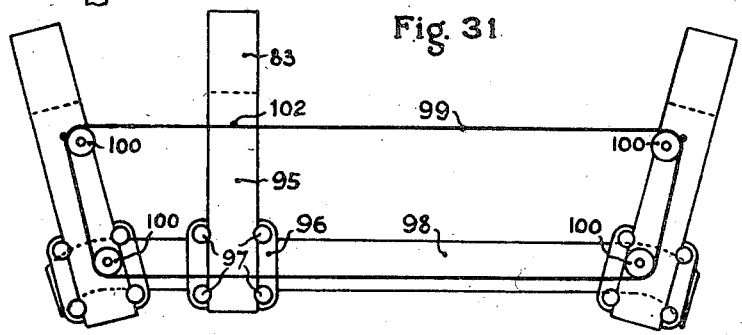

As shown by Figs. 30 and 31, every push-member 83 is carried by a vertical arm 95 vertically guided between four rollers 97 carried by a plate 96. This plate 96 carries another set of four rollers 97 in line with the first mentioned ones and which are engaged on a guiding rail 98. An endless chain 99 runs around four wheels 100 one of which is driven by an individual motor 101. One of the links of chain 99 carries a finger 102 rigid with vertical arm 95. Thus arm 95, while remaining always substantially vertical (it becomes slightly inclined at the end of its horizontal path of displacement because the chain between two wheels 100 located on the same side is also slightly inclined and rail 98 is correspondingly curved), is caused to move so that the point thereof which carries finger 102 follows the path of the chain 99.

The operation of this system is substantially as follows (the successive steps are being diagrammatically illustrated on Fig. 32):

In order to cause a vehicle to pass from the platform on to the storage area: the push-member 83 located at the front of the vehicle moves in the direction of the arrow (Fig. 32a) and is then displaced downwardly to assume the position shown on Fig. 32b, whereby the vehicle is now free to roll from the platform to the storage area; the other push-member 83 located at the rear of the vehicle is in turn moved in the direction of the arrow, as shown on Fig. 32b, and pushes the vehicle in the position illustrated by Fig. 32c. During this time, the first mentioned push-meter 83 is running along the lower branch of chain 100 toward the right. When the second mentioned push-member 83 is in the position illustrated by Fig. 32c, the first mentioned push-member 83 is at the other end of the platform and these two push-members then move in opposed directions so as to return into the relative positions illustrated by Fig. 32d. Thus, the vehicle of the platform has been pushed on the storage area to a position such that the rear end of said vehicle is well inside said storage area and can no longer be struck by the platform.

In order to shift a vehicle from a position on the storage area (close to the platform shaft) onto said platform, the operation is now as follows:

First the side conveyor 84 (not visible on Fig. 32) pushes said vehicle onto the platform. During these operations, the push-members 83 carried by the platform move as indicated on Fig. 32e so as to enable the vehicle to run on the platform. During this displacement, the parts take the relative positions illustrated by Fig. 32f and, finally, they reach the position illustrated by Fig. 32g where the vehicle on the platform is being held between the two push-members 83 which are now in the same position as initially occupied on Fig. 32a.

The margin of security illustrated in the positions 32c and 32d can be obtained by giving the arms which carry push-members 83 a substantial thickness, that is to say dimension in the horizontal direction in which the car is to be moved. However this thickness constitutes wasted space. It is therefore preferable to give the ends of rail 98 a slightly downwardly curved shape, illustrated on Fig. 31, owing to which the slight obliquity given to arms 95 pushes the vehicle beyond the edge of the storage area.

Any other means may be used in order to obtain this result. For instance, in the arrangement diagrammatically illustrated by Fig. 33, I have made use of a double deformable parallelogram constituted by primary rods 103 and secondary rods 104 connected together by a circular part 105, whereby the arm 106 which carries push-member 83 can be suitably inclined. A finger 107 fixed to one of the secondary bars 104 at a point close to the end thereof where it is hinged to arm 106 is fixed to an endless chain 108 which drives the system which follows a path similar to that shown by Fig. 31. The obliquity of the secondary rods makes it possible for the push-member to move beyond the position where a perfect safety of operation is achieved.

I might also obtain an equivalent result by providing means for lifting one of the ends of the platform so that the vehicle on said platform would run along the slope thus produced. However, with such an arrangement, if a vehicle is relatively short, it may be given a relatively high speed when running along the slope formed by the platform and in this case it will be necessary to make the arms of the storage area conveyor sufficiently strong and resilient to resist these shocks and to avoid injuries of the vehicle.

In some cases, in order for instance to reduce the cost of the installation, the means for stopping the vertically travelling platform at the desired level may be twofold, i. e. arranged to give two stopping positions which are not fixed with a very high accuracy but one of which is always slightly above the exact level of the corresponding storage area and the other always below this level. Either of these two positions will be chosen according as the vehicle is being moved from or onto the platform, respectively.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A storage installation for objects which comprises, in combination, a plurality of storage areas, a horizontal platform movable with respect to said storage areas, means for guiding said platform with respect to said storage areas into any of a plurality of positions in which it is located opposite, and on the same level as, one of said storage areas respectively, conveyor means on said platform for moving in a direction at right angles to the path of travel of said platform, on the surface thereof, objects resting on said platform, a power plant carried by said platform for operating said conveyor means, conveyor means carried by each of said storage areas for moving with respect thereto in the above mentioned direction, objects placed thereon and means for coupling the conveyor means of any of said storage areas with the power plant of the platform located opposite it at the same rate and with the same amplitude of movement as the conveyor means carried by the platform, whereby said last mentioned conveyor means can be driven by said power plant, said coupling means including an electromagnetic impositive drive device having a driving portion carried by said platform and a driven portion carried by said storage area, and electric means carried by said platform for energizing said driving portion by passing electric current therethrough.

2. An installation according to claim 1 in which each of said conveyor means includes at least two supporting rails extending in the direction of movement of said objects, rollers running on said rails, tubes of polygonal cross section extending at right angles to said rails, spindles rigid with said tubes and journalled in said rollers respectively, connecting plates at right angles to said spindles and endless chains parallel to said rails, said connecting plates being fixed to respective links to said chains.

References Cited in the file of this patent

UNITED STATES PATENTS

| | | |
|---|---|---|
| 1,554,584 | Lake | Sept. 22, 1925 |
| 1,955,959 | Harnischfeger et al. | Apr. 24, 1934 |
| 1,969,002 | Gleichman | Aug. 7, 1934 |
| 2,647,647 | Alimanestiano | Aug. 4, 1953 |
| 2,652,938 | Murphy | Sept. 22, 1953 |
| 2,696,921 | Desjardins | Dec. 14, 1954 |
| 2,705,570 | Maissian | Apr. 5, 1955 |

FOREIGN PATENTS

| | | |
|---|---|---|
| 502,984 | Great Britain | Mar. 29, 1939 |
| 689,896 | Great Britain | Apr. 8, 1953 |